May 25, 1948.  H. E. VEIT  2,442,064
FASTENER
Filed Oct. 28, 1943
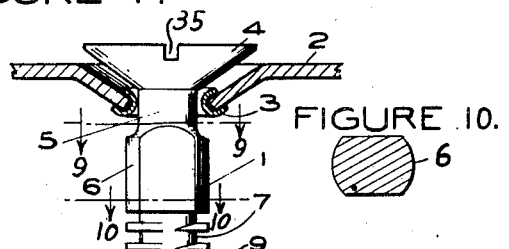
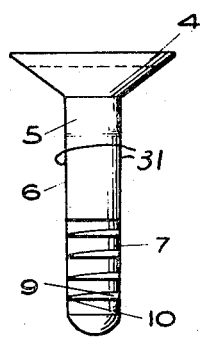
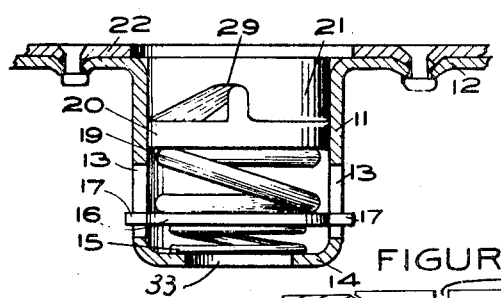
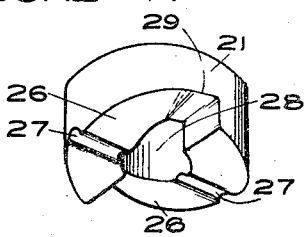
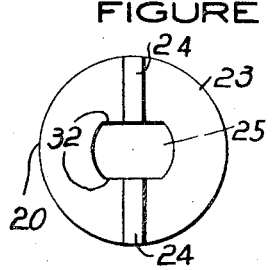
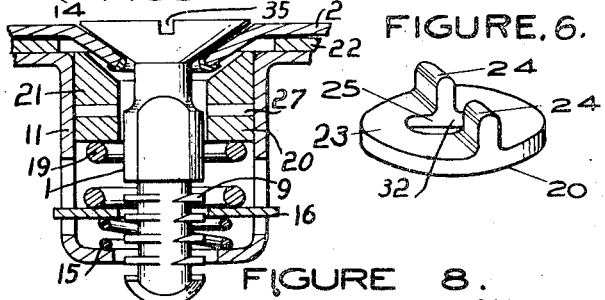
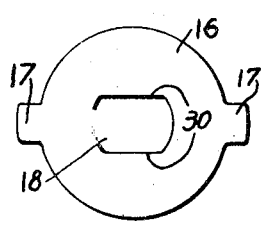
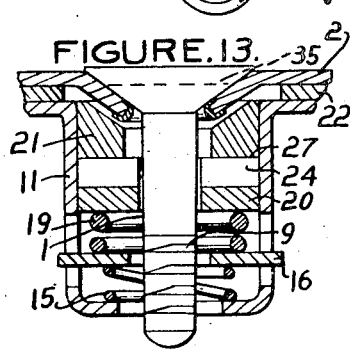
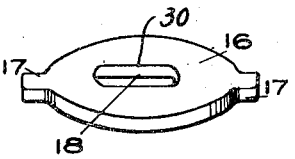
INVENTOR.
HERMANN E. VEIT
BY George Douglas Jones
ATTORNEY Patented May 25, 1948

2,442,064

UNITED STATES PATENT OFFICE 2,442,064

FASTENER

Hermann E. Veit, Parkville, Md., assignor to The Glenn L. Martin Company, Middle River, Md., a corporation of Maryland Application October 28, 1943, Serial No. 507,992

2 Claims. (Cl. 24—221.2)

1

This invention relates to an improved form of fastening device for removably securing panels and covers to other structural parts in a manner so that they may be quickly and easily unfastened and removed.

An object of this invention is to provide a fastener that will secure two members firmly together with a positive locking action. The fastener of this invention locks and unlocks with a definite snap-action.

Another object of this invention is the provision of a fastener structure, the locking action of which is independent of parts affected by wear or vibration.

Another object of this invention is to provide a fastener that will secure two members together with substantially the same tension regardless of material thickness or the thickness of interposed members.

A further object of this invention is a fastener structure by which members may be removably secured together under predetermined tension.

A still further object of this invention is the provision of a fastener in which the shear and tension loads are carried by basic structural members.

Further and other objects will become apparent from the description of the accompanying drawings which form a part of this disclosure and in which like numerals refer to like parts.

In the drawings:

Figure 1 is a view, partly in section, showing a stud assembled to a sheet.

Figure 2 is a view, partly in section, showing the locking mechanism of the fastener.

Figure 3 is a side elevational view of the stud.

Figure 4 is a perspective view of the cam.

Figure 5 is a plan view of the follower.

Figure 6 is a perspective view of the follower.

Figure 7 is a plan view of the locking plate.

Figure 8 is a perspective view of the locking plate.

Figure 9 is a section taken on the line 9—9 of Figure 1, Figure 10 is a section taken on the line 10—10 of Figure 1, Figure 11 is a section taken on line 11—11 of Figure 1, Figure 12 shows the parts of the fastener assembled in the unlocked position, and Figure 13 shows the parts of the fastener assembled in the locked position.

Figure 1 of the drawing shows a stud generally indicated as 1, assembled to a sheet of material 2. Steel grommet 3 is swaged around the dimpled opening in sheet 2 to provide a bearing in the sheet for the stud. The stud is illustrated as having a countersunk head 4, but it should be understood that any type head may be employed.

2

The stud has a neck portion 5 of circular cross-section and a shank portion 6. The end portion 7 of shank 6 is also circular in cross-section. Projecting fins 9 are no wider than the diameter of portion 7 and extend beyond the periphery of portion 7 in length and are tapered as indicated at 10 for reasons that will later be described. The locking portion of the fastener illustrated in Figure 2 shows a casing or housing member 11, having mounting flange 12. The housing is formed with slots 13 in the sides thereof and inturned flange 14, on the bottom of the housing, forms a support for retainer spring 15. Locking plate 16 has projections 17 extending from the periphery thereof, as shown in Figure 7. The hole 18 in locking plate 16 is elongated with flattened sides to conform with the shape of portions 7 and 9 of the stud. Main spring 19 extends between locking plate 16 and the follower 20. Cam 21 is secured in the housing adjacent the end mounted on sheet 22.

Follower 20, illustrated in Figures 5 and 6, consists of a disc 23, having ribs 24 on each side of opening 25. This opening also has flattened sides 32 to conform with the shape of the shank of the stud. Cam 21, illustrated in Figure 4, is shaped to fit within the housing, and has cam surfaces 26 on which portions 24 of the follower ride. The initial portions 29 of surfaces 26, corresponding to a few degrees of rotary motions of the stud, are flat so that the follower may be turned a few degrees without any axial movement. At the opposite end of surfaces 26, are grooves 27 into which portions 24 drop at the end of the travel on cam surfaces 26. This affords a positive lock after a quarter turn of the stud so that the follower may not be jarred loose from this position on the cam, thus releasing the fastener. The grooves 27 must be of such a depth that with a little extra effort, the follower will be released from the locked position on the cam. The hole 28 in the cam is circular.

It will be seen from the inspection of assembled views, Figures 1 and 2, that the stud may be inserted through the circular opening 28 in the cam and the portion 31 of the stud will extend through the opening 25 in the follower 20, the flattened opening 18 in the locking plate 16, and extend out the opening 33 in the bottom of housing 11. The opening in the cam 21 is such that the stud will turn freely therein. The relationship of the stud to the elongated opening in the follower 20 is such that the follower turns in the housing and is turned by the stud. The locking plate 16 is restrained from turning in the housing by projections 17 extending through slots 13 in the housing, but these slots permit the plate to move axially of the fastener. Springs 15 and 19 support the locking plate 16 between the follower 20 and the end of the housing so that this locking plate is free floating in the slots axially but restrained thereby from rotational motion. The end of the stud having projections 9, extends through locking plate 16 and the diameter of the shank 7 with respect to the elongated opening 18 is such that the shank 7 may turn within the locking plate and the projections 9 on the shank limit the axial motions of the locking plate 16 relative to the stud.

The stud is inserted in the fastening device as shown in Figure 12 and rotated a quarter turn to the position shown in Figure 13. As the stud is turned, follower 20 turns with the stud moving axially of the housing away from sheets 22, on the cam surfaces 26 as shown in Figure 2. The follower compresses springs 19 and 15 upon such rotation of the stud, thus tending to move locking plate 16 toward the end of the housing. Upon the first few degrees of motion of the stud, there is no axial motion of the follower, which permits projections 9 to engage the locking plate 16 and prevent relative axial motion between the stud and the locking plate. The taper 10 on the projections 9 ensures the projections engaging the locking plate. After these first few degrees of motion, the locking plate is secured against axial motion relative to the stud and further rotation of the stud causes follower 20 to move toward the locking plate, thus compressing spring 19 which urges the interlocked stud and locking plate assembly toward the end of the housing. This causes a clamping action between sheet 2 secured by the stud, and sheet 22, to which the fastener is attached, equal to the compression in spring 19 caused by the follower. Spring 15 permits motion of locking plate 16 toward the end of the housing in order to draw sheets 2 and 22 into a firm contact. The follower moves until portions 24 come to rest in grooves 27. The stud is then firmly secured in the locking mechanism against vibration.

To unlock the fastener, the stud is turned in the reversed direction a quarter turn to move portions 24 out of grooves 27 and the follower releases the compression in spring 19. The projections 9 disengage locking plate 16 and the shank of the stud may be withdrawn from the fastener.

The stud is shown with a slot 35 in the head so that it may be operated with a screw driver or similar tool. While the head of the stud is shown with a screw driver slot so that the stud may be turned by a screw driver, it is obvious that the invention is not limited to this type of head on the stud as heads may be provided to permit manual turning of the stud.

It is obvious that the springs may be made of any strength so that the clamping action may be regulated thereby. By the word spring, any resilient material, performing the function of members 15 and 19 is intended. For purposes of the above description, the stud is described as being rotated a quarter turn, but the cam surfaces may be of any angular extent.

The stud shank can be made of any length with any number of projections so that any thickness intermediate structure between sheets 2 and 22 may be accommodated.

It is to be understood that certain changes, alterations, modifications and substitutions can be made without departing from the spirit and scope of the appended claims.

I claim as my invention:

1. A fastener for securing two panels together, said fastener consisting of a female member secured to one of said panels and a male member secured to the other of said panels, the female member and male member being operatively associated, said female member comprising a housing secured at one end to said one panel, a retainer spring in said housing and located at the other end thereof, a locking plate in said housing adjacent said spring and spaced from said other end of the housing by said spring, means on said plate preventing rotational movement but permitting axial movement of the plate relative to the housing, a main spring in said housing adjacent said plate, a follower in said housing adjacent said main spring and spaced from said plate by said main spring, and a cam in said housing adjacent said secured end of the housing, said cam being operatively associated with said follower, said cam, follower, and plate having openings therein, said male member comprising a stud extending through said openings, said stud having a portion engaging the follower to rotate the same, and said stud having portions engaging the plate to cause said axial movement of the plate upon rotation of the stud.

2. A fastener for securing two panels together, said fastener consisting of a female member secured to one of said panels and a male member secured to the other of said panels, the female member and male member being operatively associated, said female member comprising a housing secured at one end to said one panel, a retainer spring in said housing and located at the other end thereof, a locking plate in said housing adjacent said spring and spaced from said other end of the housing by said spring, means on said plate preventing rotational movement but permitting axial movement of the plate relative to the housing, a main spring in said housing adjacent said plate, a follower in said housing adjacent said main spring and spaced from said plate by said main spring, and a cam in said housing adjacent said secured end of the housing, said cam being operatively associated with said follower, said cam, follower, and plate having openings therein, said male member comprising a stud extending through said openings, said stud having a portion engaging the follower to rotate the same, and said stud having portions engaging the plate to cause said axial movement of the plate upon rotation of the stud, said cam having portions thereon to move said follower axially away from said panels to compress said main spring against said plate, said plate and said stud together being urged in a direction by the follower-pressed spring to hold said panels firmly together.

HERMANN E. VEIT.

REFERENCES CITED

The following references are of record in the file of this patent:

UNITED STATES PATENTS

| Number | Name | Date |
|---|---|---|
| 974,059 | Haynes | Oct. 25, 1910 |
| 2,323,260 | Venditty | June 29, 1943 |
| 2,325,699 | Moran | Aug. 3, 1943 |
| 2,334,680 | Murphy | Nov. 16, 1943 |
| 2,337,483 | Marty | Dec. 21, 1943 |
| 2,339,591 | Weber | Jan. 18, 1944 |